United States Patent [19]

Fulton

[11] Patent Number: 4,862,049

[45] Date of Patent: Aug. 29, 1989

[54] CONSTANT AREA PULSE GENERATING NETWORK

[75] Inventor: Donald E. Fulton, Stoneham, Mass.

[73] Assignee: The Charles Stark Draper Laboratory, Inc., Cambridge, Mass.

[21] Appl. No.: 879,431

[22] Filed: Feb. 21, 1978

[51] Int. Cl.[4] .............................................. G05B 17/00
[52] U.S. Cl. .................................... 318/689; 318/648; 33/324; 74/5.6 R; 74/5.7
[58] Field of Search ............... 318/580, 596, 615, 648, 318/684, 687, 689, 341, 591, 432, 433, 650; 74/5.34, 5.4, 5.47, 5.6 R, 5.7; 33/324, 326; 328/175; 307/60, 61, 359; 361/153

[56] References Cited

U.S. PATENT DOCUMENTS

| | | | |
|---|---|---|---|
| 3,237,055 | 2/1966 | Riordan | 74/5.4 X |
| 3,477,298 | 11/1969 | Howe | 74/5.6 R X |
| 3,604,276 | 9/1971 | Hurlburt | 74/5.47 |
| 3,898,744 | 8/1975 | Johnston | 74/5.4 |
| 3,968,352 | 7/1976 | Andeen | 74/5.6 R X |

Primary Examiner—Thomas H. Tarcza
Assistant Examiner—Tod Swann
Attorney, Agent, or Firm—Lahive & Cockfield

[57] ABSTRACT

A system for generating substantially constant area pulses suitable for application to an inertial instrument torquer. The torquer current pulses are directly utilized to provide an averaging feedback loop wherein the variations in pulse width due to errors in switching pulse times are offset by amplitude control for the pulses. With this system, variations in width of the torquer current pulses are offset in a high speed, closed loop manner with compensation occurring within the pulse interval.

4 Claims, 3 Drawing Sheets

CONSTANT AREA PULSE GENERATING NETWORK

BACKGROUND OF THE INVENTION

This invention relates to inertial navigation systems, and more particularly, to torquing systems for inertial instruments.

Many forms of inertial systems require stable current pulses for application to linear torquers in order to provide highly stable, quantized levels of torque. In one form, the conventional torquing systems drive a torquer with a constant repetition rate stream of controlled width, constant amplitude pulses. In another form, the repetition rate is controlled for a stream of substantially uniform pulses.

For systems requiring fine torque quantization relative to the maximum torque level, the latter approach is generally utilized with the individual current pulses being relatively short and being applied at a high rate to the torquer. Typical conventional systems generate torque pulses by constructing a constant current source, and chopping the resultant current into constant amplitude pulses with high speed switches. The performance of torquing systems is generally expressed in terms of the electronics scale factor, or the "gain" of the torquing electronics. The scale factor is proportional to the area of the individual torque pulses, and relates the average torquing current to the average number of pulses per second. In high rate torquing systems, the relatively narrow and constant amplitude current pulses are often subject to variation from pulse to pulse, such as may be due to switching time variations of the current chopping switches. Such conditions result in an undesirable trade-off between scale factor stability and torquing rate.

Many of the prior art torquing systems, particularly, the high speed systems, utilize transistor switching circuits to accomplish the current chopping. However, in the applications for many such systems, the chopping switches are subjected to particularly hostile environments, such as a high neutron flux in the case of on-board guidance instrumentation for a missile during re-entry. Under such conditions, the gain of the current chopping transistors falls off substantially, leading to corresponding variations in switching times. As a result, the width of the chopped current pulses varies from its nominal value with the instability in the pulse width causing a corresponding instability in the scale factor.

Furthermore, in the prior art systems, the pulse width control is generally achieved through the use of a model of the torquer current. The modeling typically introduces the very type of switching errors described above, since the transistors in the model circuit also suffer degradation in certain environment. In addition, the model circuit generally includes an integrating network which introduces a first order scale factor sensitivity to the gain of the integrator, principally due to non-linear capacitance and inductive variances with time and temperature.

It is an object of the present invention to provide a network for generating control pulses for an inertial instrument torquer characterized by constant current-time integral, or area.

SUMMARY OF THE INVENTION

The present invention provides a system for generating substantially constant current-time integral, i.e. constant area, pulses for application to an inertial instrument torquer. In accordance with this invention, the torquer current is directly utilized, with no modeling, to provide an averaging feedback loop wherein the variations in pulse width due to errors in switching time are offset by amplitude control for the pulses. With this system, variations in width of the torquer current pulses are offset in a high speed, closed loop manner with compensation within the pulse interval. Furthermore, the system is relatively insensitive to circuit component variations, in contrast to the capacitance and inductance sensitivities of prior art systems utilizing pulse integrators.

In one form, the present invention includes a constant current source, a controlled current source, a current chopping network and a difference amplifier network. The controlled current source generates a controlled current which is periodically chopped to provide a series of pulses. The difference amplifier is responsive to the constant current from the constant current source and the chopped current to provide a control signal which is representative of the differnce between those currents. The controlled current source is responsive to this control signal to generate the controlled current in a proportional manner.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
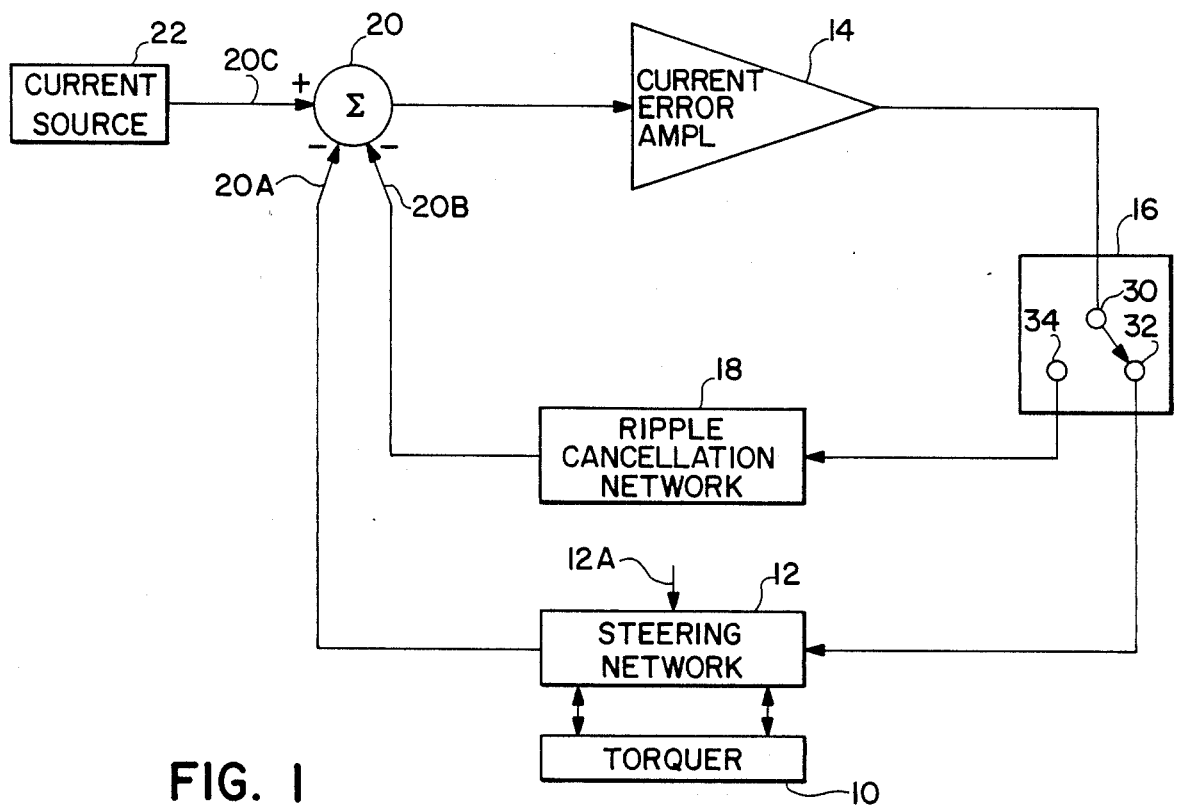
FIG. 1 shows in block diagram form an exemplary embodiment of the present invention.

FIG. 1 shows an embodiment of the present invention in block diagram form suitable for use in an inertial instrument, such as a torque-to-balance accelerometer. The illustrated embodiment includes an instrument torquer 10 and associated current steering network 12. In this configuration, the torquer 10 and network 12 are conventional in form, so that operation may be either a binary torquing mode (i.e. selectively providing positive or negative current pulses to the instrument torquer), or in a ternary torquing mode (i.e. selectively providing positive, negative or no current pulses to the instrument torquer), in response to appropriate control signals applied to control line 12A by the remainder of the inertial system (not shown).

In addition to blocks 10 and 12, the present embodiment includes a current error amplifier 14, high speed current chopper 16, ripple cancellation network 18, summation network 20 and precision current source 22. The chopper 16 includes input terminal 30, output terminals 32 and 34, and associated control circuitry. The control circuitry is adapted to cyclically control chopper 16 with a period T, so that the terminals 30 and 32 are electrically coupled during one portion of an operational cycle having duration $(n-1)/n \times T$, where n is an integer, and so that terminals 30 and 34 are electrically coupled during the remaining portion of the operational cycle.

The current error amplifier 14 is a high gain, controlled current source which produces an output current which is proportional to the output current from summation network 20. In alternative embodiments, amplifier 14 may utilize a controlled voltage source which operates in conjunction with a voltage-to-current convertor in the loop.

The output current from amplifier 14 is applied to terminal 30 of chopper 16. The terminal 32 of chopper 16 is coupled to the current steering network 12 so that the current from that terminal 32 is first applied to the instrument torquer 10 (in accordance with the appropriate steering which is conventionally accomplished), and thereafter applied to an inverting input 20A of summation network 20.

Ripple cancellation network 18 has an input connected to the terminal 34 of chopper 16 in order to receive the current applied to terminal 30 during the portion of the operational cycle when terminals 30 and 34 are coupled. Network 18 includes a crossover filter adapted to shunt the low frequency components of the input current to ground, while coupling the high frequency components to an inverting input 20B of summation network 20. The break frequency for the crossover network is below the nominal pulse frequency for the system. The precision current source 22 provides a constant current, $I_0$, to a non-inverting input 20C of summation network 20.

With this configuration, the magnitude of the current pulses applied from terminal 32 to the instrument torquer 10 and associated current steering network 12 is inversely proportional to the pulse width. By way of example, in the ternary torquing mode with the chopper network 16 being controlled so that terminals 30 and 32 are nominally coupled for $\frac{7}{8}$ of an operational cycle while terminals 30 and 34 are coupled for the remaining $\frac{1}{8}$ cycle, the system of FIG. 1 drives torquer 10 with current pulses having amplitude $+8/7\ I_0$, $-8/7\ I_0$ or 0, depending on the commanded torque requirement.

Figure 2A:
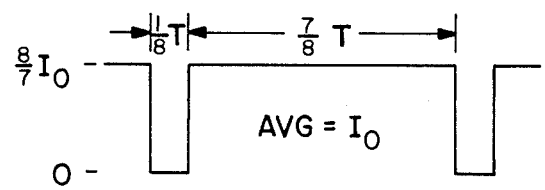
FIGS. 2A-2C show waveforms associated with the embodiment of FIG. 1.
Figure 2B:
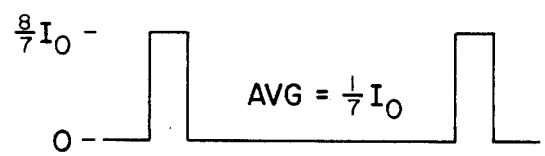
Figure 2C:
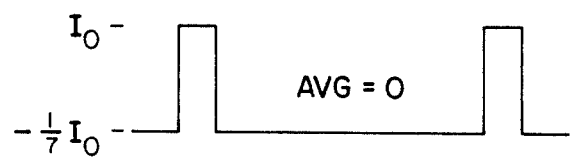

In operation, the actual torquing current at terminal 20A is compared with a precision current (from source 22). As a result of that comparison, network 20 produces a current error signal for the current error amplifier 14. The amplifier 14 then controls the amplitude of its output current, which is applied to terminal 30 of chopper 16. Chopper 16 chops the current applied to terminal 30 to provide the current waveforms illustrated in FIGS. 2A and 2B at terminals 32 and 34, respectively. The current from terminal 32 passes through steering network 12 and to the inverting terminal 20A of network 20. The current from terminal 34 passes to network 18 and the high frequency components thereof pass to the inverting terminal 20B of network 20. The current waveform at terminal 20B is illustrated in FIG. 20C. It will be understood that the average value of the current driven through current steering network 12 is $I_0$, and the average value of the current passing from network 18 to network 20 is zero.

In the present configuration, the network 18 applies a ripple cancellation current to terminal 20B of network 20. With this configuration, a high bandwidth loop is achieved since the ripple cancellation current (at terminal 20B) and the actual torquer current (at terminal 20A) have substantially matched rise and fall times so that there is no high frequency error component. As a result, the high bandwidth operation of the loop permits compensation for pulse width variation within a single operational cycle.

Figure 3:
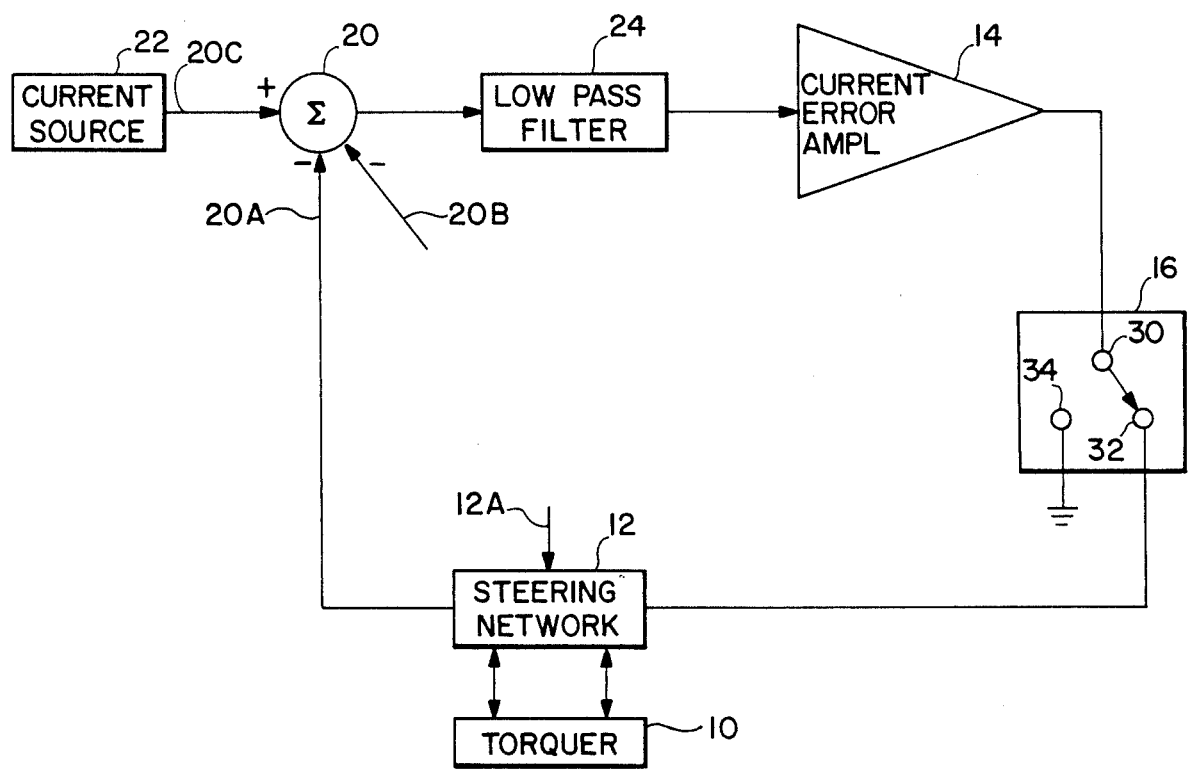
FIG. 3 shows in block diagram form another exemplary embodiment of the present invention.

FIG. 3 shows an alternative configuration where chopper 16 alternately couples the current from terminal 30 between terminal 32 (where that current is driven through the torquer to terminal 20A of summation network 20) and terminal 34, (where that current is shunted to ground so that no current is applied to terminal 20B). In this embodiment, a low pass filter 24 is utilized between summation network 20 and amplifier 14. Although this system does provide area control for the torque pulse, this control is achieved over a plurality of cycles, rather than a single cycle as in the first embodiment described above. Furthermore, the low pass filter 24 requires a relatively large characteristic dynamic range.

Figure 4:
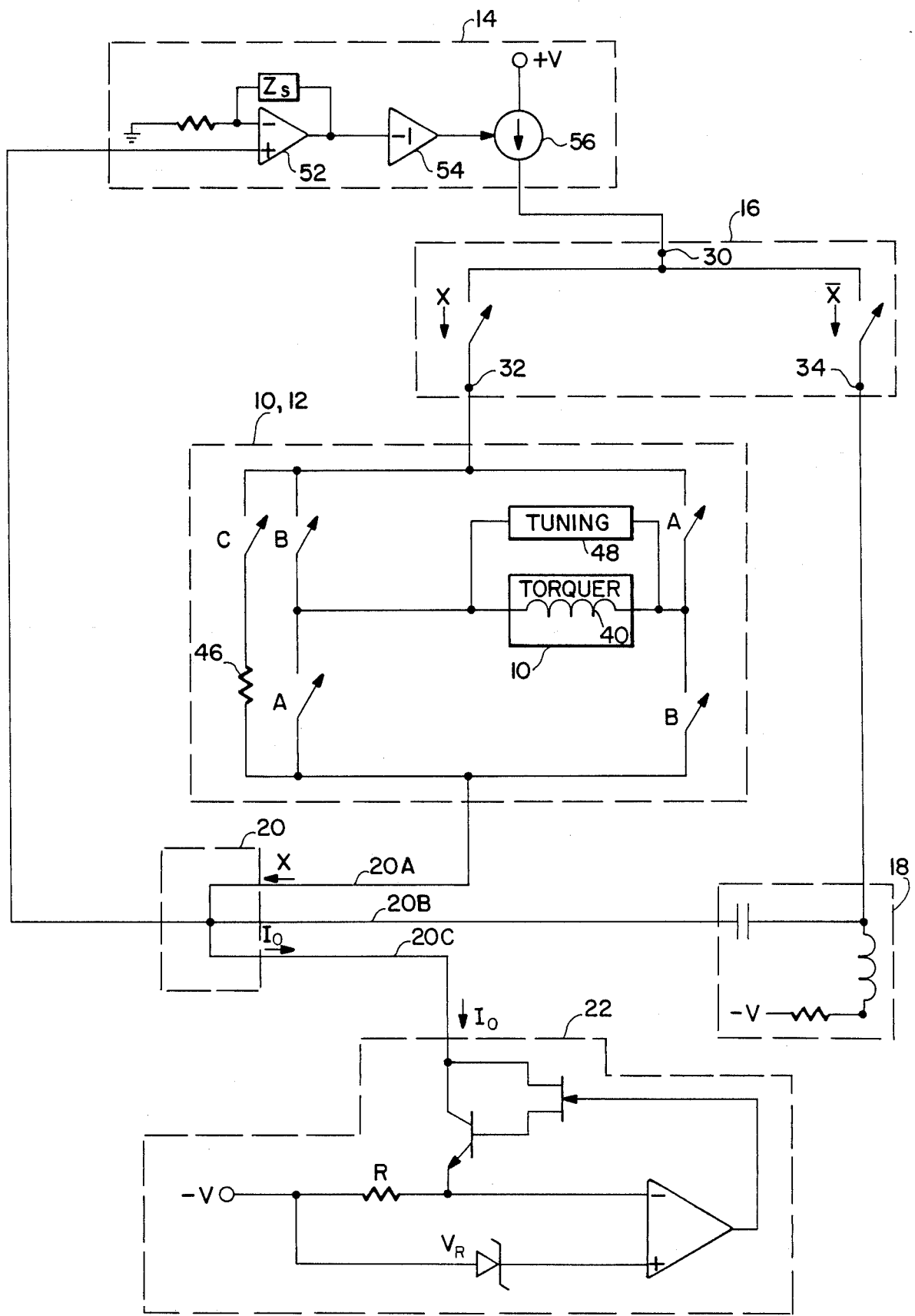
FIG. 4 shows in schematic form the embodiment of FIG. 1.

FIG. 4 shows in schematic diagram form, an exemplary circuit for the system described in conjunction with FIG. 1. Circuit elements in FIG. 4 which corresponds to elements in FIG. 1 are identified with the same reference designations. The configuration of FIG. 4 is particularly suitable for use with linear torquers, and automatically compensates for switching time errors in the chopper 16, permitting relatively high torquing rates without significant scale factor degradation.

In this exemplary configuration, the duration of the operational cycle (T) is 52 microseconds. The chopping network 16 is adapted to produce chopped current signals X and $\overline{X}$ at terminals 32 and 34, respectively, where $\overline{X}$ is the complement of X. The torque 10 and current steering network 12 include switches denoted A, B and C, instrument torquer excitation coil 40, and dummy load resistor 46. These components are conventionally arranged so that the switches A, B and C may be selectively operated in a ternary mode to provide the current pulses from terminal 32 to be applied to coil 40 in either of two directions or to the dummy resistor 46. Alternatively, switch C may be maintained in its open state while switches A and B are selectively operated to establish binary mode operation. In addition, network 12 includes conventional tuning network 48 for torquer 10. The current error amplifier 14 includes a high gain input amplifier 52 with a compensation network Z(s) (for loop stabilization) and an inverting amplifier 54 which control a current source 56.

In operation, the chopper 16 switches continuously to put a deadband of 6 microseconds between each potential current pulse. The current pulses applied to torquer 10 and network 12 are summed at a summing node 20 with the ripple cancellation current provided by network 18 and the precision current $I_0$ provided by network 22. The resultant signal is applied to control the current applied to network 16 via the current error amplifier 14. When the average value of the sum of the current pulses applied from blocks 10 and 12 ripple cancellation network 18 does not match the precision current provided by network 22, the error amplifier 14 provides a compensating change to the amplitude of the current applied to terminal 30 of chopper 16.

Network 16 nominally controls the width of the torquing pulses. If the switching times of chopper 16 change, then the average currents at terminals 20A and 34 also tend to change. For example, if the period when terminals 30 and 32 are coupled is reduced during a cycle, the average value of the current at terminal 20A tends to be reduced accordingly. However, the current error amplifier 14 responds by increasing the magnitude of the current applied to terminal 30 of chopper 16 until the average value of the current at terminal 20A is again equal to the precision current applied from source 22 to terminal 20C. Thus, the amplitude of the torquer pulses automatically adjusts to compensate for switching time changes, and the current-time integral of the torque pulse is directly controlled. With this configuration, for example, with a 19.2 KHz ternary torquer operating at 270 ma, the system of FIG. 4 reduces sensitivity to switching errors in all torquing modes by more than two orders of magnitude. Furthermore, forced switching time errors of 100 nanoseconds cause less than 20 parts per million contribution to the electronics scale factor instability.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Constant area pulse generating network comprising:
   A. constant current source means for generating a constant current,
   B. controlled source means for generating a controlled current,
   C. switch means for periodically chopping said controlled current to generate a first chopped current therefrom,
   D. difference means for generating a control signal representative of the difference between said constant current and said first chopped current,
   wherein said controlled source means is responsive to said control signal to generate said controlled current, said controlled current being proportional to said control signal.

2. The pulse generating network according to claim 1 further comprising:
   switching means for generating a second chopped current, said first and second chopped currents being complementary, and
   high pass filter network responsive to said second chopped current to generate a ripple cancellation current, and
   wherein said difference means is responsive to said constant current, said first chopped current and said ripple cancellation current to generate said control signal, said control signal being representative of said constant current less said chopped current less said ripple cancellation current.

3. An inertial instrument torquing system including an instrument torquer and associated current pulse steering network, a controller for defining direction and duty cycle of desired torque pulses, and a current pulse generating network, wherein said current pulse generating network comprises:
   A. constant current source means for generating a constant current,
   B. controlled source means for generating a controlled current,
   C. switching means for chopping said controlled current to generate a first chopped current comprising a series of current pulses, said switching means being responsive to said controller to establish the nominal transition times of said current pulses,
   D. a current summation network including an output terminal, at least one inverting terminal, and at least one non-inverting terminal, and further including means to generate an error control signal at said output terminal representative of the currents at said non-inverting terminals less the currents at said inverting terminals,
   E. means for coupling said constant current to one of said non-inverting terminals,
   F. means for coupling said series of current pulses to an input terminal of said steering network,
   G. means for coupling said series of current pulses from an output terminal of said steering network to one of said inverting terminals,
   H. means for coupling said error control signal to said controlled source, said controlled source being responsive to said error control signal to generate said controlled current, said controlled current being proportional to said error control signal,
   wherein said steering network includes means for selectively coupling said current pulses to and from said torquer, said steering network being responsive to said controller to establish the direction of each coupled pulse through said torquer.

4. A torquing system according to claim 3 wherein said current pulse generating means further includes:
   I. switching means for chopping said controlled current to generate a second chopped current comprising a series of current pulses, said first and second chopped currents being complementary,
   J. high pass filter network responsive to said second chopped current to generate a ripple cancellation current, and
   K. means for coupling said ripple cancellation current to one of said inverting terminals.

* * * * *